(12) United States Patent
Ito (10) Patent No.: US 6,220,583 B1
(45) Date of Patent: Apr. 24, 2001

(54) AIR DAMPER WITH HOOK ON PISTON

(75) Inventor: Kiichiro Ito, Yokohama (JP)

(73) Assignee: Piolax, Inc., Yokohama (JP)

( * ) Notice: Subject to any disclaimer, the term of this patent is extended or adjusted under 35 U.S.C. 154(b) by 0 days.

(21) Appl. No.: 09/433,130

(22) Filed: Nov. 3, 1999

(30) Foreign Application Priority Data

Nov. 6, 1998 (JP) .................................................. 10-315529

(51) Int. Cl.$^7$ ....................................................... B60R 7/06

(52) U.S. Cl. .............................. 267/71; 267/34; 267/226; 267/291

(58) Field of Search ................................ 267/70, 71, 72, 267/226, 34, 291, 73, 74, 69, 64.11

(56) References Cited

U.S. PATENT DOCUMENTS 5,333,845 * 8/1994 Seiichi ................................... 268/70

* cited by examiner

Primary Examiner—Matthew C. Graham
(74) Attorney, Agent, or Firm—Howard & Howard (57) ABSTRACT

An air damper of the present invention is provided with a cylinder whose one end is closed and other end is open; a piston which is movable along an axial direction of the cylinder within the cylinder in a state where an end of a string is connected to the piston; a recess groove formed in a peripheral surface of the piston; an O-ring seal between the cylinder and the piston and movably fitted to the recess groove; a coil spring butted against one of a pair of flanges defining the recess groove of the piston for biasing the piston toward the one end of the cylinder; a hook provided on one of the pair of flanges, the end of the string being attached to the hook; and opposed notches formed by notching portions of the pair of flanges of the piston corresponding to opposite sides of the hook.

13 Claims, 7 Drawing Sheets

AIR DAMPER WITH HOOK ON PISTON

BACKGROUND OF THE INVENTION

The present invention relates to an air damper, and more particularly, to a cylinder type air damper that can suitably be used with a glove box or the like in an automobile.

Figure 8:
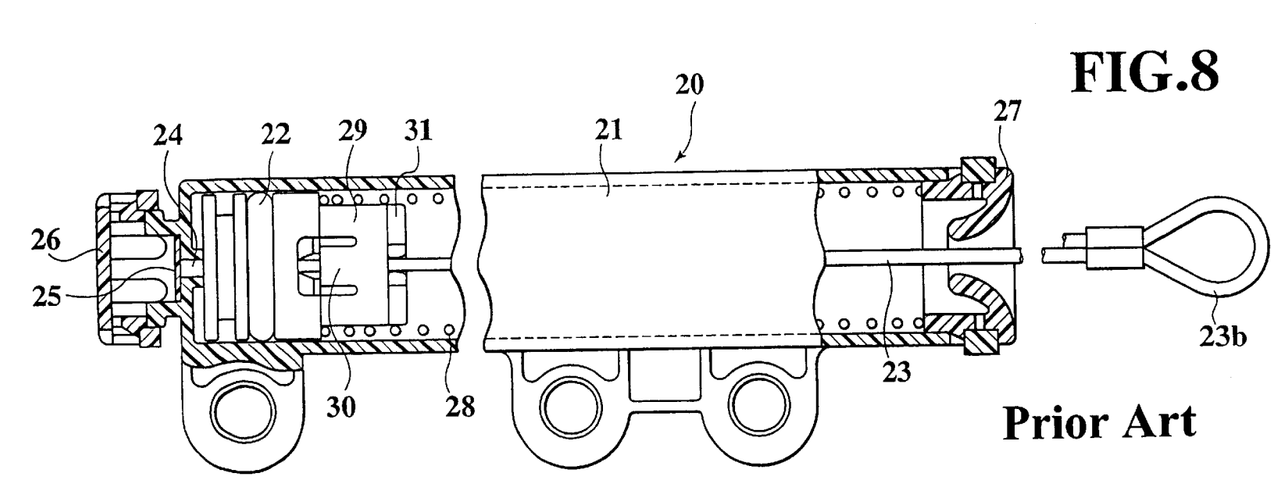
FIG. 8 is a partial sectional view of a conventional air damper.

As shown in FIG. 8, a conventional air damper 20 of this type comprises a cylindrical cylinder 21 whose opposite ends are open, a piston 22 to which a base end of a string 23 is connected for moving within the cylinder 21, an endcap 26 having a valve 25 for opening and closing a communication hole 24 which is open at one end opening of the cylinder 21, a guide cap 27 for guiding the movement of the string 23 at the other end open side of the cylinder 21, and a compression coil spring 28 interposed between the guide cap 27 and the piston 22 in the cylinder 21.

When this air damper is used in a glove box of an automobile, the cylinder 21 is fixed at the side of an instrument panel, and a tip end 23b of the string 23 extending from the guide cap 27 of the cylinder 21 to the outside is fixed to the side of the glove box. As the door of the glove box is moved to its open position, the string 23 is gradually pulled out from the cylinder 21, and the piston 22 is moved in the same direction against the spring pressure of a compression coil spring 28. With this operation, a damper effect is obtained by a flowing resistance of air passing through an orifice (not shown) which is opened toward the piston 22, to ensure that the glove box is slowly moved toward its open position.

When the door of the glove box is moved into its closed position, the piston 22 together with the string 23 is forcibly pushed back into the cylinder 21 by the spring pressure of the compression coil spring 28, and air accumulated in the cylinder 21 is released to the outside from the end cap 26 through the communication hole 24 which is opened by the valve 25. Therefore, the piston 22 is swiftly moved within the cylinder 21, which facilitates the closing operation of the glove box.

SUMMARY OF THE INVENTION

Figure 9:
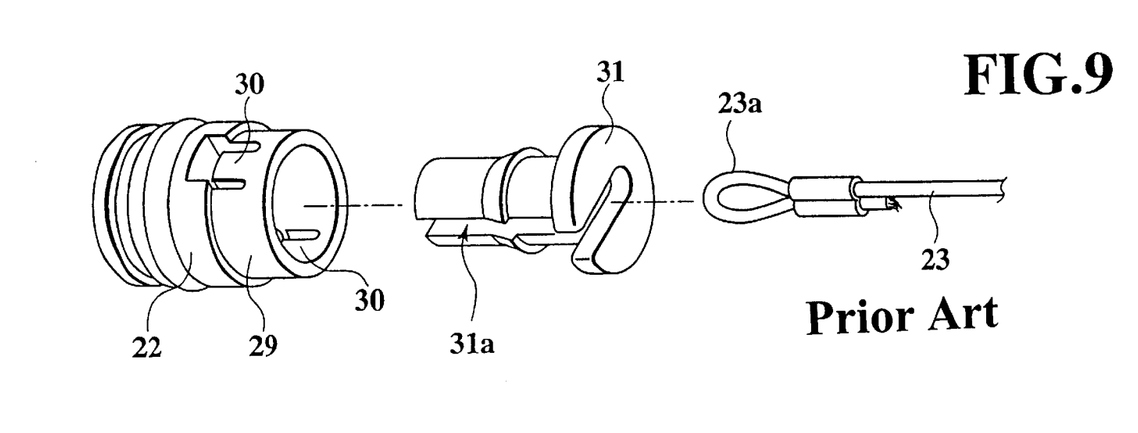
FIG. 9 is an enlarged perspective view showing a string and a piston before the conventional air damper is assembled.

In the conventional air damper, however, if the air damper is examined in more detail, when the base end 23a of the string 23 is connected to the piston 22, as shown in FIG. 9, a side of the piston 22 which also serves as a mounting seat of the compression coil spring 28 is integrally formed with a connection cylinder 29. The connection cylinder 29 is formed with a pair of resilient lock claws 30. On the other hand, a separate clip 31 formed with a slit 31a is mounted to the base end 23a of the string 23. When the clip 31 is fitted into the connection cylinder 29, the resilient lock claws 30 become locked, thereby connecting the base end 23a of the string 23 to the piston 22.

Therefore, in the case of the conventional air damper, there are numerous parts that comprise the clip body 31. Further, when the base end 23a of the string 23 is connected to the piston 22, the base 23a of the string 23 is mounted to the clip 31 through the slit 31a and then, the clip 31 must be locked to the connection cylinder 29 of the piston 22. As a result, many steps are required to assemble the camper assembly.

The present invention overcomes the disadvantages of conventional air dampers listed above. It is an object of the invention to provide an air damper with a minimal number of parts and effectively facilitates assembly.

An air damper of the present invention is provided with: a cylinder whose one end is closed and the other end is opened; a piston which is movable along an axial direction of the cylinder within the cylinder in a state where an end of a string is connected to the piston; a recess groove formed in an peripheral surface of the piston; an O-ring sealing between the cylinder and the piston and movably fitted to the recess groove; a coil spring butted against one of a pair of flanges defining the recess groove of the piston for biasing the piston toward the one end of the cylinder; a hook provided on the one of the pair of flanges, the end of the string being attached to the hook; and opposed notches formed by notching portions of the pair of flanges of the piston corresponding to opposite sides of the hook.

With this structure, an operator inserts his or her finger, a jig or the like into the spaces of the notches to easily hook the end of the string to the hook, and he or she can mount the string to the piston. Therefore, no additional parts are required and efficient assembly is realized. Further, since the hook itself is small, it is possible to obtain an air damper having a small and rigid piston.

Preferably, each of the notches is formed such that the notch spreads in a diametrical direction of the cylinder.

Further, one of the flanges is preferably provided with a wall for supporting a seat winding portion of the coil spring such that the wall stands so that the coil spring is reliably and easily mounted.

Here, it is preferable that the wall is plurally provided such as to be opposed in a direction substantially perpendicular to a direction along which the opposed notches are provided such as to be located inside of the coil spring.

According to such a structure, since the walls and the hook are disposed along one straight line to avoid the notches, assembly is reliably enhanced. In addition, since the width and the height of the wall can be increased, the coil spring can be mounted more reliably.

An orifice may be provided in the recess groove of the piston in a diametrical direction of the piston.

In such a case, a recess is preferably provided in a periphery of one of opposite ends of the orifice which is located outside in the diametrical direction of the cylinder so that foreign matter, such as fiber pieces and the like caused by contact with the string at the time of assembly, can be prevented from blocking the orifice.

Further, an orifice may be provided in the piston in a direction substantially parallel to the axial direction of the piston.

In such a case, if a recess is provided around the periphery of one of opposite ends of the orifice which is located at the side of the other end of the cylinder, it is preferable because foreign matter such as fiber pieces and the like caused by contact with the string at the time of assembly can be prevented from blocking the orifice.

Further, the orifice is preferably located in a central portion of one flange of the piston so that a damping force is reliably generated with a simple structure.

When the orifice is provided in a direction substantially parallel to the axial direction of the piston, it is preferable that the orifice is located at a position where a movable limit locus determined by a peripheral length of the end of the string does not interfere with the orifice, because foreign matter such as fiber pieces and the like caused by contact with the string at the time of assembly can be prevented from blocking the orifice.

Preferably, the hook includes a tip end that is inclined inwardly in a diametrical direction of the cylinder, so the string can be reliably mounted.

Further, it is preferable that one flange is provided with a wall supporting the seat winding portion of the coil spring in a standing manner, and a rib is provided between the hook and the wall, so that the rigidity of the hook can be secured.

Further, it is preferable that each pair of flanges defining the recess groove of the piston include a small diameter portion, because influence of a burr generated during formation can be eliminated.

DETAILED DESCRIPTION OF THE PREFERRED EMBODIMENTS

Embodiments of the present invention will be explained in detail with reference to the drawings below.

An air damper of a first embodiment of the present invention will be explained first.

As shown in FIGS. 1 to 5, an air damper 100 comprises a cylindrical cylinder 1 having a first closed end and a second open end, a piston 2 that moves in the cylinder 1 and that is connected to an annular base end 3a of a string 3, a guide cap 4 for guiding the movement of the string 3 at the open end of the cylinder 1, and a compression coil spring 5 interposed between the guide cap 4 and the piston 2 for resiliently biasing the piston 2 toward the closed end of the cylinder 1.

As shown in FIGS. 2 and 3A to 3D, the piston 2 is formed with a wide annular recess groove 7 around which an O-ring 6 is movably fitted, and the recess groove 7 is defined by a pair of flange walls 8A and 8B. Flange wall 8A also serves as a mounting seat of the compression coil spring 5 and is integrally formed at its central portion with a reversed J-shaped hook 9 for hooking the annular base end 3a of the string 3. Portions of the flange wall 8A located at opposite sides of the hook 9 are notched into a fan-like shape such that the opposite sides open in a diametrical direction of the cylinder 1. The recess groove 7 is formed at the bottom of the flange wall 8A corresponding to the fan-like notched portions 10 with a pair of communication grooves 11. An orifice 12 is located in a side surface of one of the communication grooves 11 in the diametrical direction of the cylinder 1.

A guide piece 13 guides the portion of the string 3 that extends from the hook when the annular base end 3a of the string 3 is hooked around the hook 9. Only an inner surface side of a tip end 9a of the hook 9 itself is swelled and inwardly inclined, and gaps L1 and L2 from a guide wall 14, which will be described later, are set to establish a relation of L1<L2. With this design, the annular base end 3a of the string 3 passes over the tip end 9a of the hook 9, a finger of an operator is automatically separated from the opposed guide walls 14, so that the annular base end 3a can smoothly pass through the tip end 9a. Therefore, the hooking operation is facilitated with the help of the guide piece 13, and the base end 3a of the string 3 is prevented from becoming disengaged from the hook 9.

In addition, the pair of guide walls 14 for supporting a seat winding portion of the compression coil spring 5 rise such as to be opposed to each other at positions perpendicular to the notched portion 10 of the one flange wall 8A. The guide walls also serve as the mounting seat of the compression coil spring 5, and each of the guide walls 14 and the hook 9 are disposed along a straight line to avoid the notched portion. With this design, the hooking ability of the base end 3a of the string 3 with respect to the hook 9 is not deteriorated, and each of the guide walls 14 is set as wide and high as possible, and the seat winding portion of the compression coil spring 5 can be stably supported. Further, one of the guide walls 14 is connected to the hook 9 through a rib wall 15. Therefore, it is possible to effectively prevent the hook 9 from bending from the force of the string 3 due to the support provided by the rib wall 15 and the fitting state of the compression coil spring 5 over guide walls 14.

Peripheral edges of the flange wall 8B, which do not serve as the mounting seat of the compression coil spring 5, corresponding to the communication grooves 11 are cut to form cut portions 16. Air accumulated in the cylinder 1 is guided in the direction of the communication grooves 11 from the cut portions 16. Peripheral edges corresponding to the guide walls 14 are also cut so that even if a burr is generated in the cut portions 17 by parting, the burr is not brought into contact with an inner peripheral surface of the cylinder 1. The burr generated by the parting becomes a significant issue at the side of the flange wall 8A, which also serves as the mounting seat of the compression coil spring 5. Therefore, peripheral edges corresponding to the guide walls 14 are similarly cut to form cut portions 18.

Figure 1:
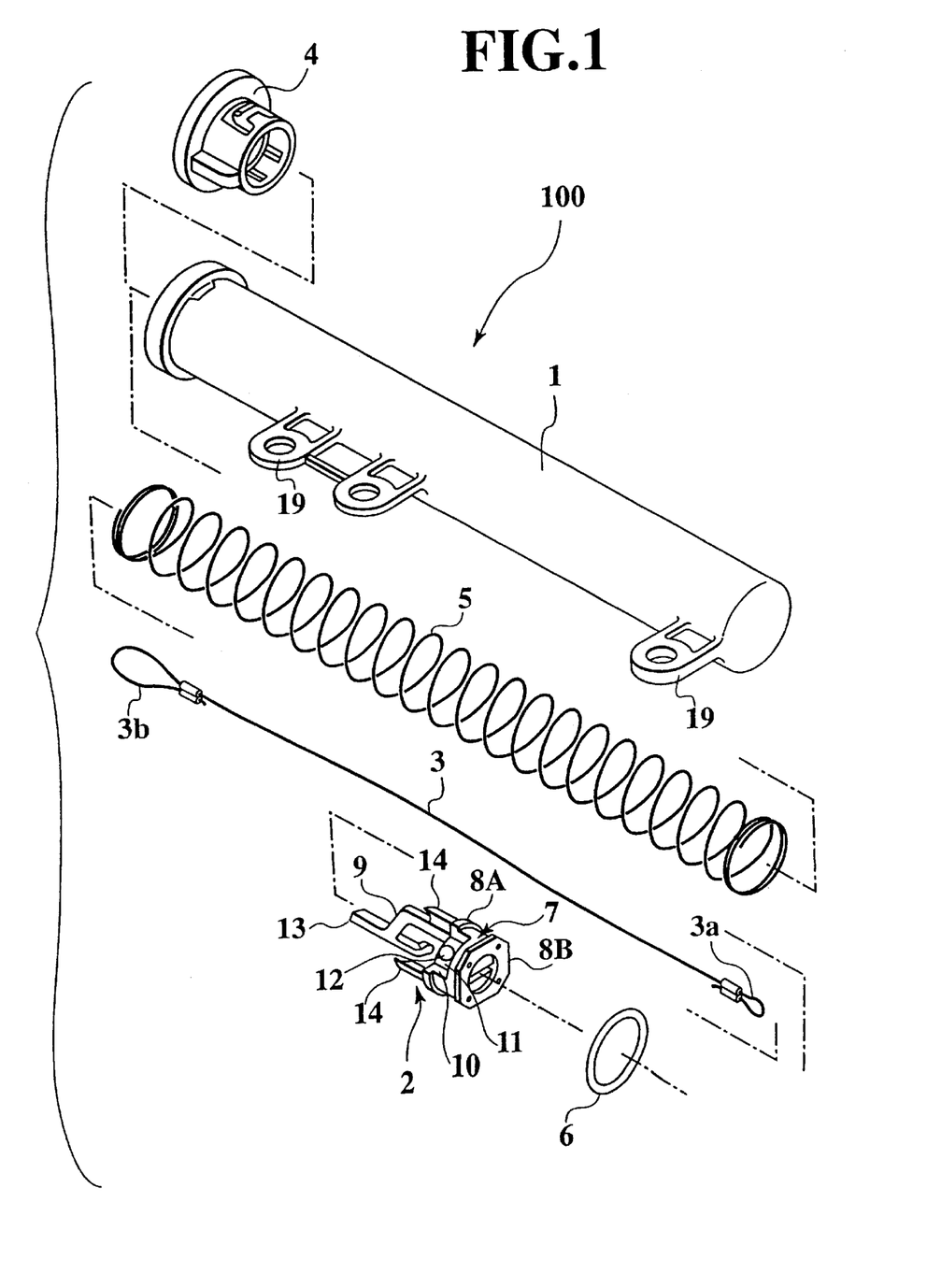
FIG. 1 is an exploded perspective view of an air damper according to a first embodiment of the present invention.
Figure 2:
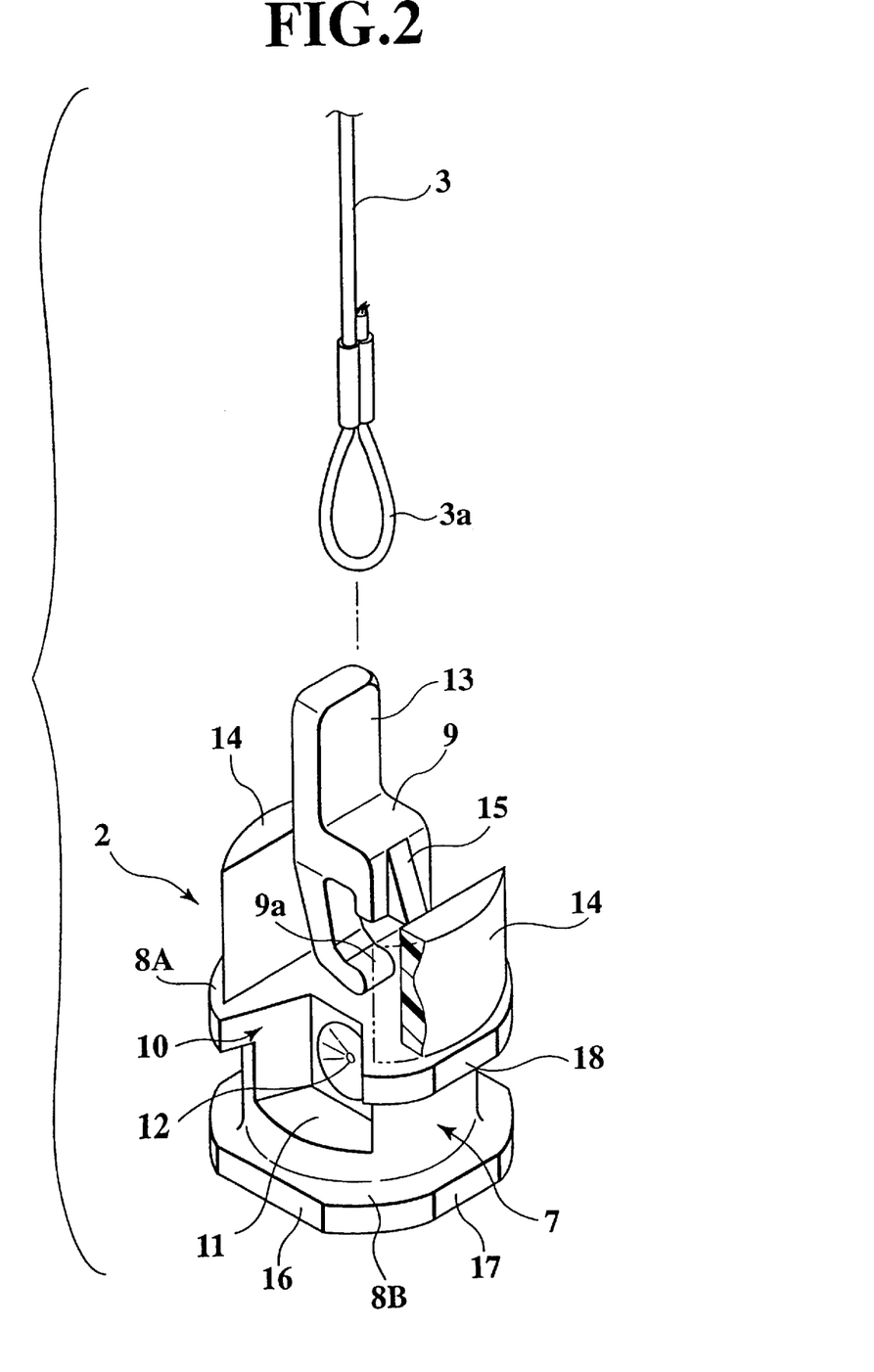
FIG. 2 is an enlarged perspective view showing a string and a piston of the first embodiment before assembly.
Figures 3A, 3C:
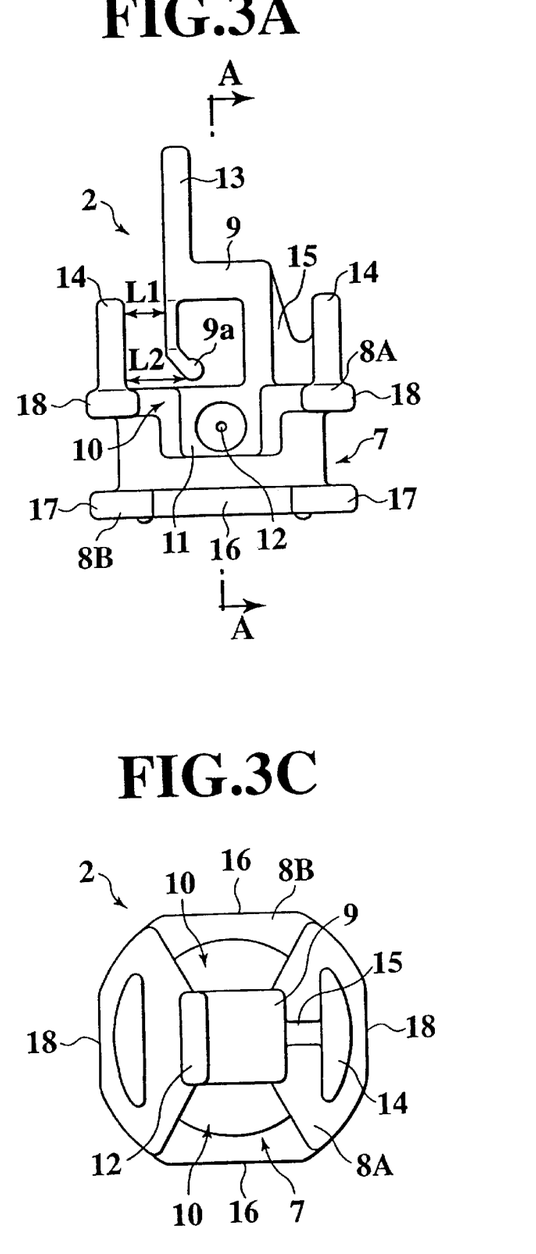
FIG. 3A is a front view of the piston of the first embodiment.
FIG. 3C is a plan view of the piston of the first embodiment.
Figure 3B:
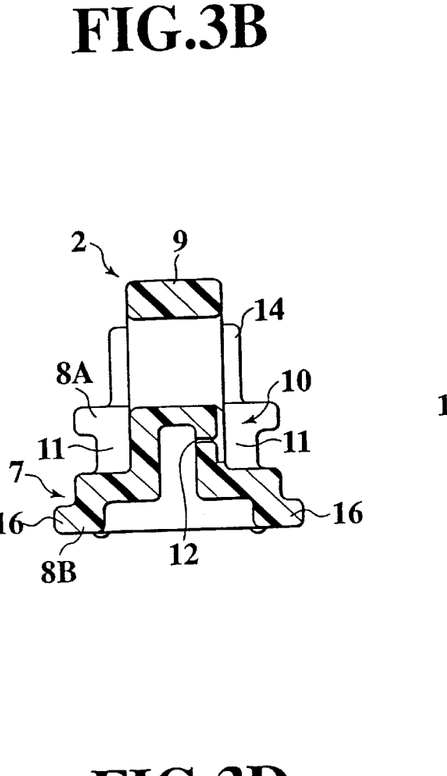
FIG. 3B is a sectional view of the piston taken along the line A—A in FIG. 3A.
Figure 3D:
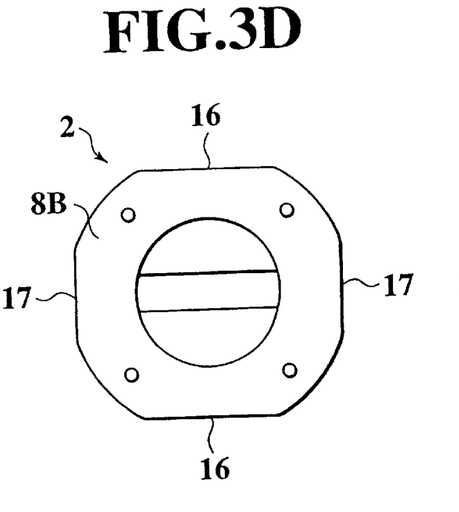
FIG. 3D is a bottom view of the piston of the first embodiment.
Figure 4:
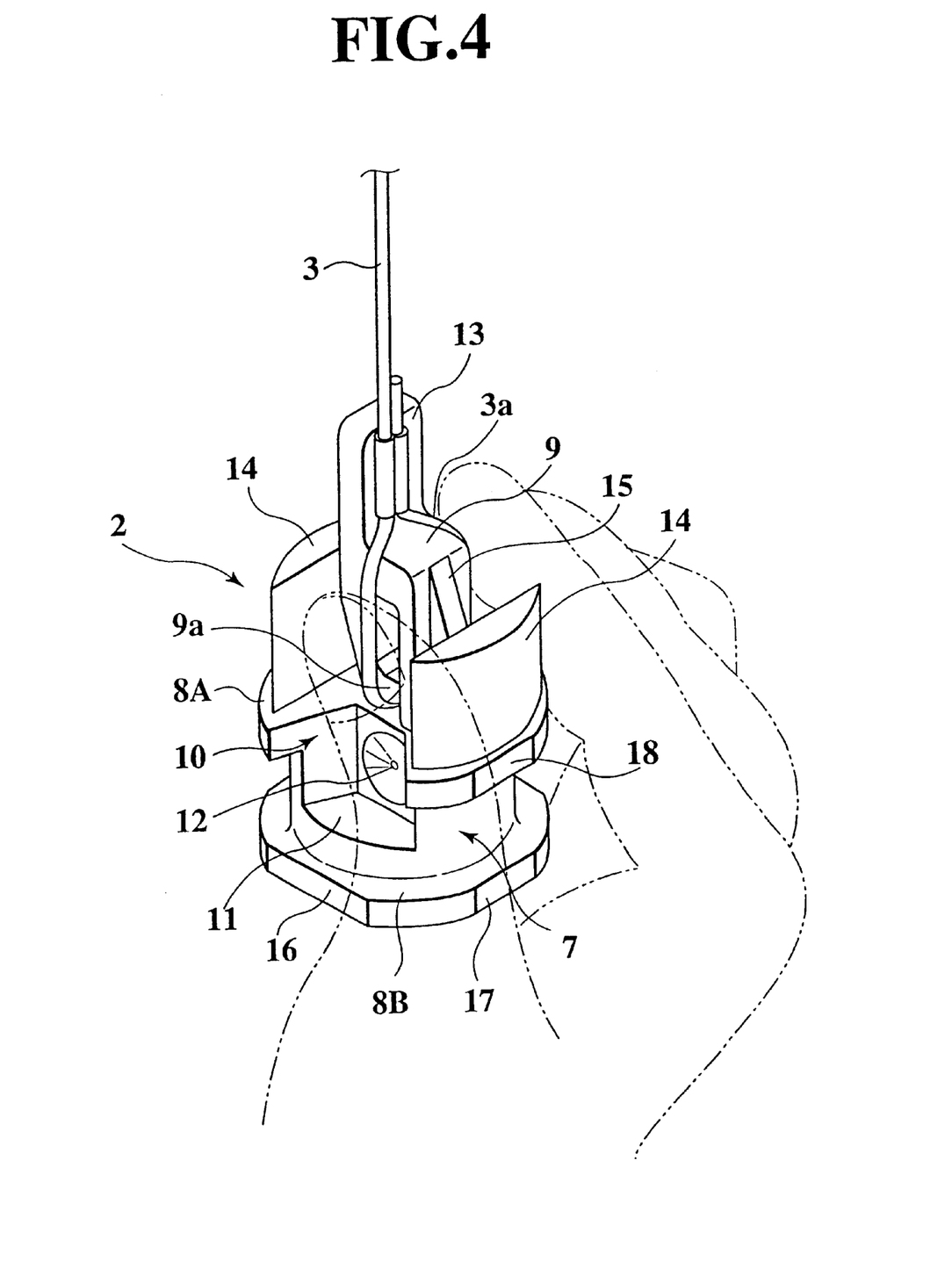
FIG. 4 is an enlarged perspective view showing the string and the piston of the first embodiment at the time of assembly.

When the air damper having the above-described structure is assembled, the annular base end 3a of the string 3 is first hooked to the hook 9 of the piston 2. In the first embodiment, as described above, portions of the flange wall 8A located at the opposite sides of the hook 9 are notched. Therefore, as shown in FIG. 4, the guide piece 13 and notched spaces generated at the opposite sides of the hook 9 are positively utilized by inserting a finger (or a jig) into the spaces to easily hook the annular base end 3a of the string 3 to the hook 9. That is, as compared with the conventional air damper, the connecting operation is greatly simplified. Further, since each of the notched portions 10 of the flange wall 8A is cut into a fan-shape, which spreads toward its outer periphery, the finger of the operator can easily inter, and should not be injured. Since the hooking operation becomes easier, the hook 9 itself can be made smaller, which makes it possible to reduce the piston 2 in size and to increase its rigidity.

Figure 5:
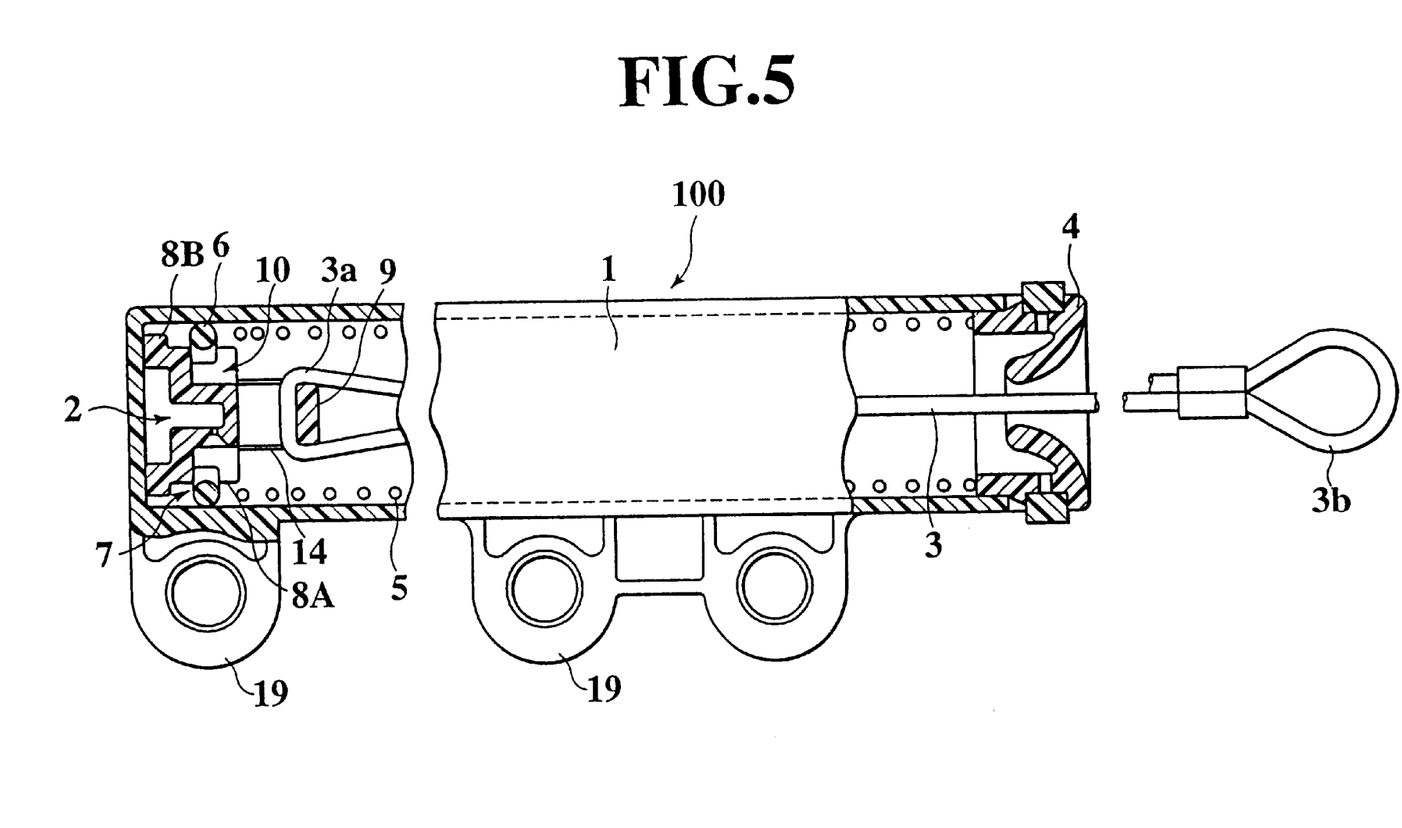
FIG. 5 is a partial sectional view of the air damper of the first embodiment.

Thereafter, the tip end 3b of the string 3 not hooked to the hook 9 passes through the inside of the compression coil spring 5. The seat winding portion of the compression coil spring 5 is supported by the pair of guide walls 14, and the piston 2 and the compression coil spring 5 are pushed into the cylinder 1 from the open end of the cylinder 1. Lastly, the guide cap 4 is mounted to the open end of the cylinder 1, as shown in FIG. 5. Therefore, the one-way type air damper is easily assembled.

When the air damper is used with a glove box, although it is not illustrated in the drawing, the cylinder 1 is fixed at the side of the instrument panel through the mounting piece 19 as in the conventional air damper, the tip end 3b of the string 3 extending from the guide cap 4 of the cylinder 1 to the outside is fixed at the side of the glove box. When the glove box side is moved to its open position, the string 3 is gradually pulled out from the cylinder 1, and the piston 2 is moved in the same direction against the spring pressure of the compression coil spring 5. During this operation, a damper effect is obtained by the flowing resistance of air passing through the orifice 12 which is opened in the communication grooves 11 of the piston 2, to ensure that the glove box is slowly moved toward its opening state. In this case, since the O-ring 6 moves in the recess groove 7, each of the communication grooves 11 is closed.

When the glove box door is moved to its closed position, the piston 2 together with the string 3 is forcibly pushed back into the cylinder 1 by the spring pressure of the compression coil spring 5. In accordance with this movement, the O-ring 6 is moved in the opposite direction within the recess groove 7 to open each of the communication grooves 11, thereby releasing the air accumulated in the cylinder 1 to the outside through the communication grooves 11 from the cut portions 16 of the flange wall 8B. With this operation, the piston 2 swiftly moves in the cylinder 1 to help close the glove box door.

Further, in such a state, the air accumulated in the cylinder 1 flows into each of the communication grooves 11 from the cut portions 16 of the flange wall 8B through the recess groove 7. Further, each of the communication grooves 11 is set smaller than the inner diameter of the compression coil spring 5. Therefore, the air should not collide against the compression spring 5 and should not flow outside and enter the gap between the cylinder 1 and the compression coil spring 5. Therefore, the air releasing efficiency is excellent, and a noise caused by collision of air can effectively be prevented.

Figure 6:
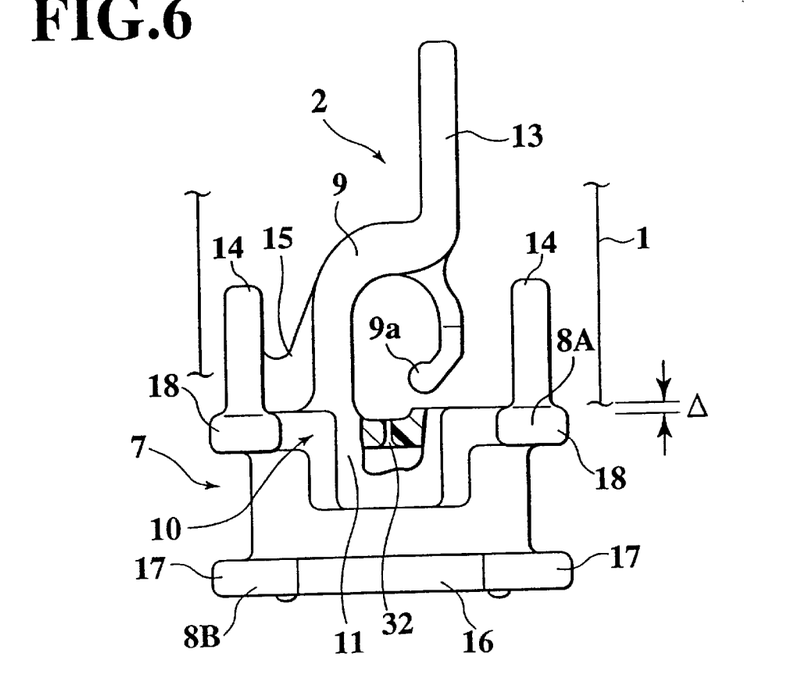
FIG. 6 is a partial sectional view of a piston in a cylinder of an air damper according to a second embodiment of the invention.

Next, an air damper according to a second embodiment will be explained. The second embodiment is similar to the first embodiment. As shown in FIG. 6, one difference is that an orifice 32 is located in a central portion of the flange wall 8A. The flange wall 8a also serves as the mounting seat of the compression coil spring 5 that runs parallel to the axial direction of the cylinder 1, and an opening of the orifice 32 is recessed by Δ toward the recess groove 7. In the second embodiment, an orifice 32 is provided on the axis of the cylinder 1. Only an outer wall of a portion of the cylinder 1 is illustrated.

In the second embodiment, just as in the first preferred embodiment, the annular base end 3a of the string 3 easily hooks around the hook 9 due to fingers fitting into the spaces on opposite sides of the hook 9 to guide the string 3 around the guide piece 13. In addition, when the string 3 is hooked to the hook 9, the annular base end 3a of the string 3 does not come into contact with the opening edge of the orifice 32 directly due to the recess of Δ. Thus, effectively preventing a portion of the string 3 from being cut, and preventing its fiber pieces from occluding the orifice 32.

Figure 7:
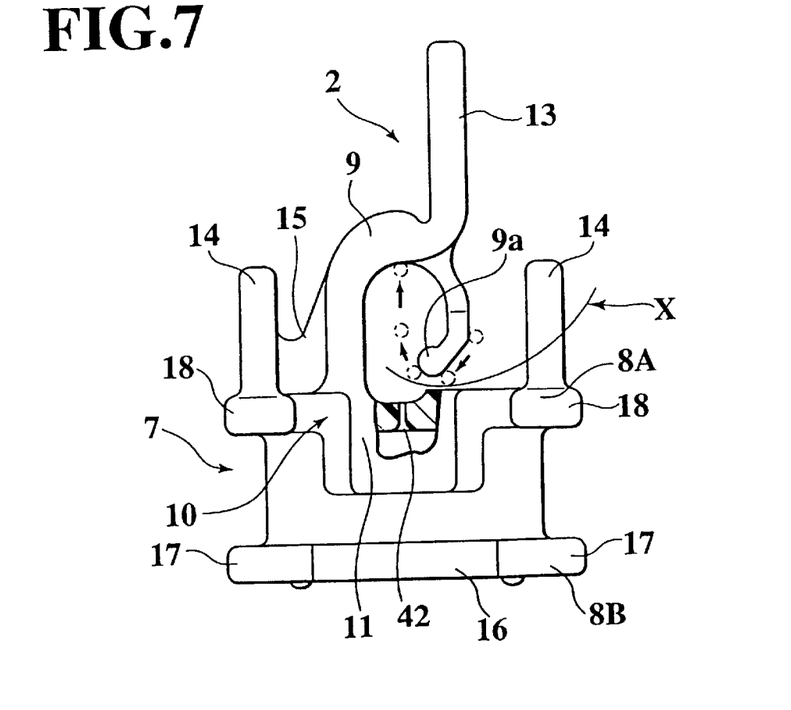
FIG. 7 is a partially cut-away front view of a piston of an air damper according to a third embodiment of the invention.

Lastly, an air damper of a third embodiment will be explained. The third embodiment is based on the second embodiment and also basically follows the first embodiment. Features of the third embodiment are that an orifice 42 opened in the central portion of the flange wall 8A is located away from a movable limit locus X which is determined by a peripheral length of the annular base end 3a of the string 3 so as not to interface with the orifice 42. Although the opening of the orifice 42 is recessed toward the recess groove 7 in the drawing, in the third embodiment, since it is essential only that the opening of the orifice 42 is away from the movable limit locus X of the annular base end 3a of the string 3, the opening of the orifice 42 is not necessarily recessed.

Therefore, even in the third embodiment, positively utilizing spaces generated at the opposite sides of the hook 9, by inserting a finger into the spaces to obtain a guide of the guide piece 13, and it is possible to extremely easily hook the annular base end 3a of the string 3 to the hook 9. In addition, especially when the string is hooked to the hook 9, since the opening of the orifice is located away from the movable limit locus X, the annular base end 3a of the string 3 should not come into contact with the orifice 42. Therefore, as in the second embodiment, the string 3 should not be cut, and its fiber pieces should not occlude the orifice 42.

What is claimed is:

1. An air damper, comprising:
a cylinder having a first closed end and a second open end;
a piston which is movable along an axial direction of said cylinder within said cylinder in a state where an end of a string is connected to said piston;
a recess groove formed on a peripheral surface of said piston;
an O-ring seal positioned between said cylinder and said piston and movably fitted to said recess groove;
a coil spring butted against one of a pair of flanges defining said recess groove of said piston for biasing said piston toward said first end of said cylinder;
a hook provided on said one of said pair of flanges, the end of the string being attached to said hook; and
opposed notches formed by notching portions of said pair of flanges of said piston corresponding to opposite sides of said hook.

2. An air damper according to claim 1, wherein each of said notches is formed such as to spread in a diametrical direction of said cylinder.

3. An air damper according to claim 1, wherein said one of said pair of flanges is provided with a wall for supporting a seat winding portion of said coil spring such that said wall stands.

4. An air damper according to claim 3, wherein said wall is plurally provided such as to be opposed in a direction substantially perpendicular to a direction along which said opposed notches are provided, and such as to be located inside of said coil spring.

5. An air damper according to claim 1, wherein an orifice is provided in said recess groove of said piston in a diametrical direction of said piston.

6. An air damper according to claim 5, wherein a recess is provided in a periphery of one of opposite ends of said orifice which is located outside in the diametrical direction of said cylinder.

7. An air damper according to claim 1, wherein an orifice is provided in said piston in a direction substantially parallel to said axial direction of said piston.

8. An air damper according to claim 7, wherein a recess is provided in a periphery of one of opposite ends of said orifice which is located at said second end of said cylinder.

9. An air damper according to claim 8, wherein said orifice is located in a central portion of said one of said pair of flanges of said piston.

10. An air damper according to claim 7, wherein said orifice is located at a position where a movable limit locus determined by a peripheral length of the end of the string does not interfere with said orifice.

11. An air damper according to claim 1, wherein said hook includes a tip end that is inclined inwardly in a diametrical direction of said cylinder.

12. An air damper according to claim 11, wherein said one of said pair of flanges is provided with a wall supporting the seat winding portion of said coil spring in a standing manner, and a rib is provided between said hook and said wall.

13. An air damper according to claim 1, wherein each of said pair of flanges defining said recess groove of said piston includes a small diameter portion.

\* \* \* \* \*